US012659677B2

(12) United States Patent
Flood

(10) Patent No.: US 12,659,677 B2
(45) Date of Patent: Jun. 16, 2026

(54) HEARING AID ANTENNA OPTIMIZED FOR EAR TO EAR COMMUNICATIONS

(71) Applicant: Starkey Laboratories, Inc., Eden Prairie, MN (US)

(72) Inventor: Stephen Paul Flood, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 140 days.

(21) Appl. No.: 18/451,241

(22) Filed: Aug. 17, 2023

(65) Prior Publication Data

US 2024/0089674 A1 Mar. 14, 2024

Related U.S. Application Data

(63) Continuation of application No. 17/821,362, filed on Aug. 22, 2022, now Pat. No. 11,765,527, which is a continuation of application No. 16/948,487, filed on Sep. 21, 2020, now Pat. No. 11,432,082, which is a continuation of application No. 16/665,646, filed on Oct. 28, 2019, now Pat. No. 10,785,583, which is a continuation of application No. 14/706,173, filed on May 7, 2015, now abandoned.

(51) Int. Cl.
*H04R 25/00* (2006.01)
*H01Q 1/27* (2006.01)
*H01Q 9/28* (2006.01)

(52) U.S. Cl.
CPC ........... *H04R 25/554* (2013.01); *H01Q 1/273* (2013.01); *H01Q 9/28* (2013.01); *H04R 25/552* (2013.01); *H04R 2225/023* (2013.01); *H04R 2225/51* (2013.01)

(58) Field of Classification Search
CPC ................ H04R 25/554; H04R 25/552; H04R 2225/023; H04R 2225/51; H04R 25/00; H01Q 1/273; H01Q 9/28; H01Q 1/27
See application file for complete search history.

(56) References Cited

U.S. PATENT DOCUMENTS 3,369,245 A 2/1968 Rea
5,721,783 A 2/1998 Anderson
(Continued)

FOREIGN PATENT DOCUMENTS

EP 2105989 A2 9/2009
EP 2458674 A2 5/2012
(Continued)

OTHER PUBLICATIONS

Notice of Intent to Grant and Text Intended to Grant from counterpart European Application No. 16168645.6 dated Jul. 17, 2020, 40 pp.

(Continued)

*Primary Examiner* — Yosef K Laekemariam
(74) *Attorney, Agent, or Firm* — Shumaker & Sieffert, P.A.

(57) ABSTRACT

A hearing aid is described which incorporates an antenna integrated into the housing that is configured to radiate with linear polarization such that the electric field is perpendicular to the head of a wearer. The described technique results in lower propagation losses from ear to ear and an improvement in ear-to-ear communications using a far-field link (e.g., in the 2.4 GHz band).

14 Claims, 5 Drawing Sheets

(56) References Cited

U.S. PATENT DOCUMENTS

| | | | |
|---|---|---|---|
| 6,594,370 B1 | 7/2003 | Anderson | |
| 7,289,853 B1 | 10/2007 | Campbell et al. | |
| 7,646,356 B2 | 1/2010 | Adel et al. | |
| 8,605,922 B2 | 12/2013 | Pulimi et al. | |
| 9,554,219 B2 | 1/2017 | Kvist | |
| 10,297,910 B2 | 5/2019 | Hosadurga et al. | |
| 10,785,583 B2 | 9/2020 | Flood | |
| 11,432,082 B2 | 8/2022 | Flood | |
| 2005/0099341 A1 | 5/2005 | Zhang et al. | |
| 2007/0080889 A1 | 4/2007 | Zhang | |
| 2008/0218293 A1 | 9/2008 | Liu et al. | |
| 2009/0214064 A1 | 8/2009 | Wu et al. | |
| 2009/0231204 A1 | 9/2009 | Shaker et al. | |
| 2010/0202639 A1 | 8/2010 | Christensen et al. | |
| 2012/0002830 A1 | 1/2012 | Solum | |
| 2012/0087506 A1 | 4/2012 | Ozden | |
| 2013/0216076 A1 | 8/2013 | Knudsen et al. | |
| 2013/0241778 A1 | 9/2013 | Orime et al. | |
| 2013/0342407 A1 | 12/2013 | Kvist et al. | |
| 2013/0343586 A1 | 12/2013 | Kvist et al. | |
| 2014/0023216 A1* | 1/2014 | Solum | H04R 25/554 381/315 |
| 2014/0113828 A1 | 4/2014 | Gilbert et al. | |
| 2015/0030190 A1 | 1/2015 | Rabel et al. | |
| 2015/0042524 A1 | 2/2015 | Kerselaers et al. | |
| 2015/0208180 A1 | 7/2015 | Martius et al. | |
| 2016/0050502 A1 | 2/2016 | Kvist et al. | |
| 2016/0330552 A1 | 11/2016 | Flood | |
| 2018/0115055 A1 | 4/2018 | Hosadurga et al. | |
| 2020/0059742 A1 | 2/2020 | Flood | |
| 2021/0076144 A1 | 3/2021 | Flood | |
| 2023/0082154 A1 | 3/2023 | Flood | |

FOREIGN PATENT DOCUMENTS

| | | |
|---|---|---|
| EP | 1326302 A2 | 7/2013 |
| EP | 2680366 A1 | 1/2014 |
| EP | 2765650 A1 | 8/2014 |
| EP | 2802037 A1 | 11/2014 |
| EP | 2835862 A1 | 2/2015 |
| WO | WO-2005081583 A1 | 9/2005 |
| WO | WO-2014090420 A1 | 6/2014 |

OTHER PUBLICATIONS

Notice of Intent to Grant and Text Intended to Grant from counterpart European Application No. 16168645.6 dated Nov. 16, 2020, p. 38.

Response to Communication pursuant to Article 94(3) EPC dated Mar. 13, 2019, from counterpart European Application No. 16168645.6 filed Aug. 20, 2019, 11 pp.

Summons to Attend Oral Proceedings Pursuant to Rule 115(1) EPC from counterpart European Application No. 16168645.6 dated Feb. 11, 2020, 9 pp.

"U.S. Appl. No. 14/706,173, Advisory Action mailed Apr. 7, 2017", 3 pgs.

"U.S. Appl. No. 14/706,173, Advisory Action mailed May 22, 2018", 4 pgs.

"U.S. Appl. No. 14/706,173, Final Office Action mailed Jan. 12, 2017", 19 pgs.

"U.S. Appl. No. 14/706,173, Final Office Action mailed Feb. 8, 2018", 19 pgs.

"U.S. Appl. No. 14/706,173, Final Office Action mailed May 28, 2019", 23 pgs.

"U.S. Appl. No. 14/706,173, Non Final Office Action mailed Jun. 20, 2016", 14 pgs.

"U.S. Appl. No. 14/706,173, Non Final Office Action mailed Sep. 18, 2017", 17 pgs.

"U.S. Appl. No. 14/706,173, Non Final Office Action mailed Oct. 9, 2018", 21 pgs.

"U.S. Appl. No. 14/706,173, Response filed Feb. 11, 2019 to Non Final Office Action mailed Oct. 9, 2018", 7 pgs.

"U.S. Appl. No. 14/706,173, Response filed Mar. 13, 2017 to Final Office Action mailed Jan. 12, 2017", 8 pgs.

"U.S. Appl. No. 14/706,173, Response filed Apr. 9, 2018 to Final Office Action mailed Feb. 8, 2018", 8 pgs.

"U.S. Appl. No. 14/706,173, Response filed Sep. 20, 2016 to Non Final Office Action mailed Jun. 20, 2016", 7 pgs.

"U.S. Appl. No. 14/706,173, Response filed Dec. 18, 2017 to Non Final Office Action mailed Sep. 18, 2017", 10 pgs.

"U.S. Appl. No. 15/331,077, Corrected Notice of Allowability mailed Mar. 5, 2019", 2 pgs.

"U.S. Appl. No. 15/331,077, Corrected Notice of Allowability mailed Mar. 20, 2019", 2 pgs.

"U.S. Appl. No. 15/331,077, Non Final Office Action mailed Jul. 23, 2018", 10 pgs.

"U.S. Appl. No. 15/331,077, Notice of Allowability mailed Jan. 25, 2019", 2 pgs.

"U.S. Appl. No. 15/331,077, Notice of Allowance mailed Jan. 9, 2019", 8 pgs.

"U.S. Appl. No. 15/331,077, Response filed Oct. 23, 2018 to Non Final Office Action mailed Jul. 23, 2018", 10 pgs.

"U.S. Appl. No. 16/665,646, Non Final Office Action mailed Dec. 19, 2019", 10 pgs.

"U.S. Appl. No. 16/665,646, Notice of Allowance mailed May 19, 2020", 7 pgs.

"U.S. Appl. No. 16/665,646, Response filed Mar. 19, 2020 to Non Final Office Action mailed Dec. 19, 2019", 8 pgs.

"U.S. Appl. No. 16/948,487, Final Office Action mailed Feb. 4, 2022", 8 pgs.

"U.S. Appl. No. 16/948,487, Non Final Office Action mailed Aug. 16, 2021", 12 pgs.

"U.S. Appl. No. 16/948,487, Notice of Allowance mailed Apr. 22, 2022", 7 pgs.

"U.S. Appl. No. 16/948,487, Preliminary Amendment filed Nov. 30, 2020", 6 pgs.

"U.S. Appl. No. 16/948,487, Response filed Apr. 4, 2022 to Final Office Action mailed Feb. 4, 2022", 7 pgs.

"U.S. Appl. No. 16/948,487, Response filed Nov. 16, 2021 to Non Final Office Action mailed Aug. 16, 2021", 7 pgs.

"U.S. Appl. No. 17/821,362, Non Final Office Action mailed Feb. 7, 2023", 8 pgs.

"U.S. Appl. No. 17/821,362, Notice of Allowance mailed Jul. 27, 2023", 7 pgs.

"U.S. Appl. No. 17/821,362, Preliminary Amendment filed Nov. 15, 2022", 6 pgs.

"U.S. Appl. No. 17/821,362, Response filed May 8, 2023 to Non Final Office Action mailed Feb. 7, 2023", 7 pgs.

"European Application Serial No. 16168645.6, Communication Pursuant to Article 94(3) EPC Mar. 13, 2019", 7 pgs.

"European Application Serial No. 16168645.6, Extended European Search Report mailed Oct. 7, 2016", 9 pgs.

"European Application Serial No. 16168645.6, Response filed Jun. 28, 2017 to Extended European Search Report mailed Oct. 7, 2016", 19 pgs.

"European Application Serial No. 17196023.0, Extended European Search Report mailed Feb. 26, 2018", 9 pgs.

Angelopoulos, E S, et al., "A modified bow-tie slot antenna fed by a CPW-to-CPW transition loaded with inductively coupled slots for ultra wide—band applications", IEEE International Workshop on Antenna Technology; IEEE IWAT 2005; Marina Mandarin Hotel, Singapore, IEEE Operations Center, Piscataway, NJ, (Mar. 7, 2005), 513-516.

Dushyantt, Garg, et al., "Multi band compact bow-tie slot antenna for WLAN applications", Electromagnetic Compatibility (APEMC), Asia-Pacific Symposium on, IEEE, (May 21, 2012), 597-600.

Huang, C Y, et al., "Multiple band-stop bow-tie slot antennas for multi band wireless systems", IET Microwaves Antennas & Propaga, vol. 2, No. 6, (Sep. 8, 2008), 588-593.

Mathew, Jibish, et al., "A modified bow-tie antenna for dual band RFID applications", IEEE 9th International Conference on Intelligent Systems and Control (ISCO), (Jan. 9, 2015), 1-3.

(56) References Cited

OTHER PUBLICATIONS

Mio, Nagatoshi, "Downsized Bow-Tie Antenna with Folded Elements", IEICE Transactions on Electronics, Institute of Electronics, Tokyo, JP, vol. E93C, No. 7, XP001557472, ISSN: 0916-8524, (Jul. 1, 2010), 1098-1104.
Pierce, Richard G., "Broadband Planar Modified Aperture Bowtie Antenna", IEEE Antennas and Wireless Propagation Letters, vol. 12, (2013), 4 pgs.
Yu-Wei, Liu, et al., "Metal strip-embedded slot bowtie antenna for Wi-Fi and WiMAX applications", Antennas and Propagation Society International Symposium (APSURSI), 2010 IEEE, IEEE, Piscataway, NJ, USA, (Jul. 11, 2010), 1-4.
Communication pursuant to Article 94(3) EPC from counterpart European Application No. 16168645.6 dated Mar. 13, 2019, 7 pp.
Extended Search Report from counterpart European Application No. 16168645.6 dated Oct. 7, 2016, 9 pp.
Nagatoshi et al., "Downsized Bow-Tie Antenna with Folded Elements", IEICE transactions on electronics, Jul. 1, 2010, 7 pp.
Response to Communication Pursuant to Rule 71(3) EPC dated Jul. 17, 2020, from counterpart European Application No. 16168645.6, filed Oct. 8, 2020, 10 pp.
Response to Extended Search Report dated Oct. 7, 2016, from counterpart European Application No. 16168645.6 filed Jun. 28, 2017, 20 pp.
Response to Summons to Attend Oral Proceedings pursuant to Rule 115(1) EPC dated Feb. 11, 2020, including Main Request, from European Patent Application No. 16168645.6] filed Jun. 11, 2020, 23 pp.
Response to Summons to Attend Oral Proceedings pursuant to Rule 115(1) EPC dated Feb. 11, 2020, including Main Request, from European Patent Application No. 16168645.6] filed Jun. 12, 2020, 15 pp.
Response to Summons to Attend Oral Proceedings pursuant to Rule 115(1) EPC dated Feb. 11, 2020, including Main Request, from European Patent Application No. 16168645.6] filed May 18, 2020, 18 pp.

* cited by examiner

HEARING AID ANTENNA OPTIMIZED FOR EAR TO EAR COMMUNICATIONS

CROSS-REFERENCE TO RELATED APPLICATION

This application is a continuation of U.S. patent application Ser. No. 17/821,362, filed Aug. 22, 2022, which is a continuation of U.S. patent application Ser. No. 16/948,487, filed Sep. 21, 2020, now issued as U.S. Pat. No. 11,432,082, which is a continuation of U.S. patent application Ser. No. 16/665,646, filed Oct. 28, 2019, now issued as U.S. Pat. No. 10,785,583, which is a continuation of U.S. patent application Ser. No. 14/706,173, filed May 7, 2015, each of which are incorporated by reference herein in their entirety.

FIELD OF THE INVENTION

This invention pertains to electronic hearing aids, hearing aid systems, and methods for their use.

BACKGROUND

Hearing aids are electronic instruments that compensate for hearing losses by amplifying sound. The electronic components of a hearing aid may include a microphone for receiving ambient sound, processing circuitry for amplifying the microphone signal in a manner that depends upon the frequency and amplitude of the microphone signal, a speaker for converting the amplified microphone signal to sound for the wearer, and a battery for powering the components. Hearing aids may also incorporate wireless transceivers for enabling communication with an external device and/or communication between two hearing aids worn by a user.

DETAILED DESCRIPTION

Hearing aids may incorporate wireless transceivers that enable communication communications between the two hearing aids typically worn by a user. Such ear-to-ear communication provides the convenience of synchronized adjustments to operating parameters as well enabling binaural signal processing between the hearing aids. Wireless transceivers may also be used by hearing aids to enable audio streaming from external sources such as a smartphones. In the case of ear-to-ear communication, the link between the hearing aids may be implemented as a near-field magnetic induction (NFMI) link operated in a frequency band between 3 and 15 MHz which easily propagates through and around the human head. The frequency band used for NFMI links, however, has a very limited propagation range. Therefore, in the case of communications between a hearing aid and an external device, far-field RF (radio-frequency) links using higher frequency bands such as the 900 MHz or 2.4 GHz ISM (Industrial Scientific Medical) bands are preferred. The high frequency nature of far-field signals, however, also results in a short wavelength that does not propagate well through and around the human head and body. One possible solution to this problem is to use an NFMI transceiver for ear-to-ear communications and a far-field transceiver for communications with external sources, but that requires the hearing aid incorporate two separate radios with consequent added power consumption as well as other disadvantages. Another possible solution is the use of NFMI for ear-to-ear communications and a relay device that translates far-field communications from an external device into NFMI signals transmitted to the hearing aid (e.g., a neck loop transmitting to a telecoil in the hearing aid). A relay device produces some time delay, however, and that may not be acceptable in certain situations.

Described herein is a hearing aid which incorporates an antenna integrated into the housing that is configured to radiate with linear polarization such that the electric field is perpendicular to the head of a wearer. The described technique results in lower propagation losses from ear to ear and an improvement in ear-to-ear communications using a far-field link (e.g., in the 2.4 GHz band).

Figure 1:
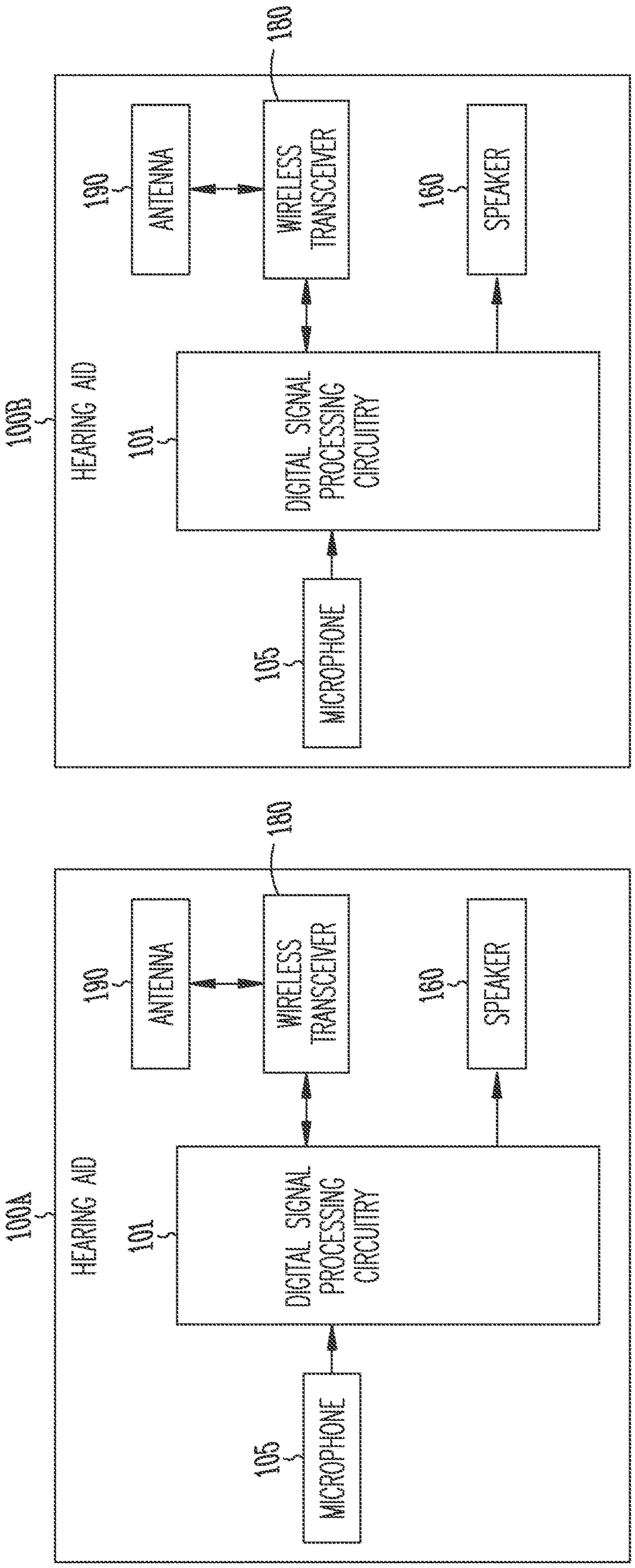
FIG. 1 shows the basic electronic components of example hearing aids.

FIG. 1 illustrates the basic functional components of an example hearing assistance system that includes hearing aid 100A and hearing aid 100B for bilateral wearing by a user. The components of each hearing aid are identical and are contained within a housing that may be placed, for example, in the external ear canal or behind the ear. As explained below, depending upon the type of hearing aid, some of the components may be contained in separate housings. A microphone 105 receives sound waves from the environment and converts the sound into an input signal. The input signal is then amplified by pre-amplifier and sampled and digitized by an A/D converter to result in a digitized input signal. The device's digital signal processing (DSP) circuitry 101 processes the digitized input signal into an output signal in a manner that compensates for the patient's hearing deficit. The digital processing circuitry 101 may be implemented in a variety of different ways, such as with an integrated digital signal processor or with a mixture of discrete analog and digital components that include a processor executing programmed instructions contained in a processor-readable storage medium. The output signal is then passed to an audio output stage that drives speaker 160 (also referred to as a receiver) to convert the output signal into an audio output. A wireless transceiver 180 is interfaced to the hearing aid's DSP circuitry and connected to the feedpoint of a bowtie-type antenna 190 for transmitting and/or receiving radio signals. The wireless transceiver 180 may enable ear-to-ear communications between the two hearing aids as well as communications with an external device. When receiving an audio signal from an external source, the wireless receiver 180 may produce a second input signal for the DSP circuitry that may be combined with the input signal produced by the microphone 105 or used in place thereof.

Figure 2:
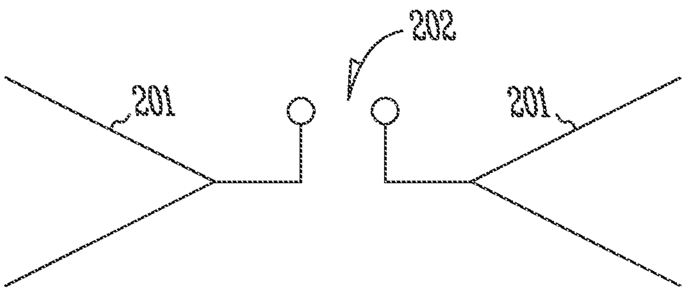
FIG. 2 illustrates a form bowtie-type antenna.
Figure 3:
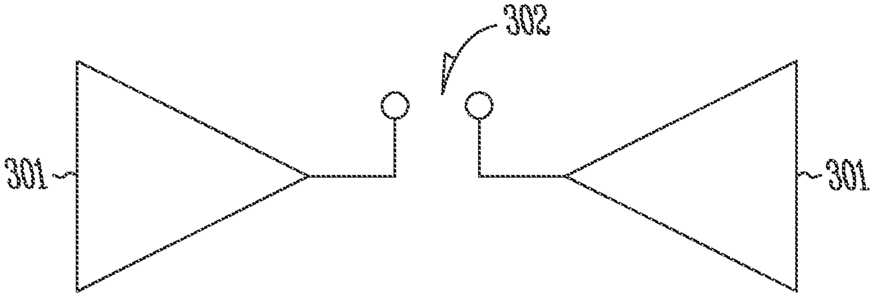
FIG. 3 illustrates a solid bowtie-type antenna.

The bowtie-type antenna 190 connected the wireless transceiver 180 may be configured to produce a linearly polarized signal perpendicular to the user's head with a polarization otherwise optimized for ear-to-ear communications. In one embodiment, as illustrated by FIG. 2, the antenna 190 is a form bowtie-type antenna that includes wire sections 201 and a feedpoint 202. In another embodiment, illustrated by FIG. 3, the antenna 190 is a solid bow-type antenna that includes solid sections 301 and a feedpoint 302.

Either embodiment may be integrated into the housing by, for example, flex circuits disposed on each of two half-sections of the housing, by printing the antenna on the interior or exterior of each of two half-sections of the housing, by printing the antenna on an internal framework or spine contained within the housing. In another embodiment, the two half-sections of the housing may be made of conductive material and separated by a dielectric material so as to constitute a solid bowtie-type antenna.

In certain types of hearing aids, the electronic components are enclosed by a housing that is designed to be worn in the ear for both aesthetic and functional reasons. Such devices may be referred to as in-the-ear (ITE), in-the-canal (ITC), completely-in-the-canal (CIC), or invisible-in-the-canal (IIC) hearing aids. Another type of hearing aid, referred to as a behind-the-ear (BTE) hearing aid, utilizes a housing that is worn behind the ear that contains all of the components shown in FIG. 1 including the receiver (i.e., the speaker) that conducts sound to an earbud inside the ear via an audio tube. Another type, referred to as a receiver-in-canal (RIC) hearing aid, also has a housing worn behind the ear that contains all of the components shown in FIG. 1 except for the receiver, with the output state then being electrically connected to the receiver worn in the ear canal.

Figure 4:
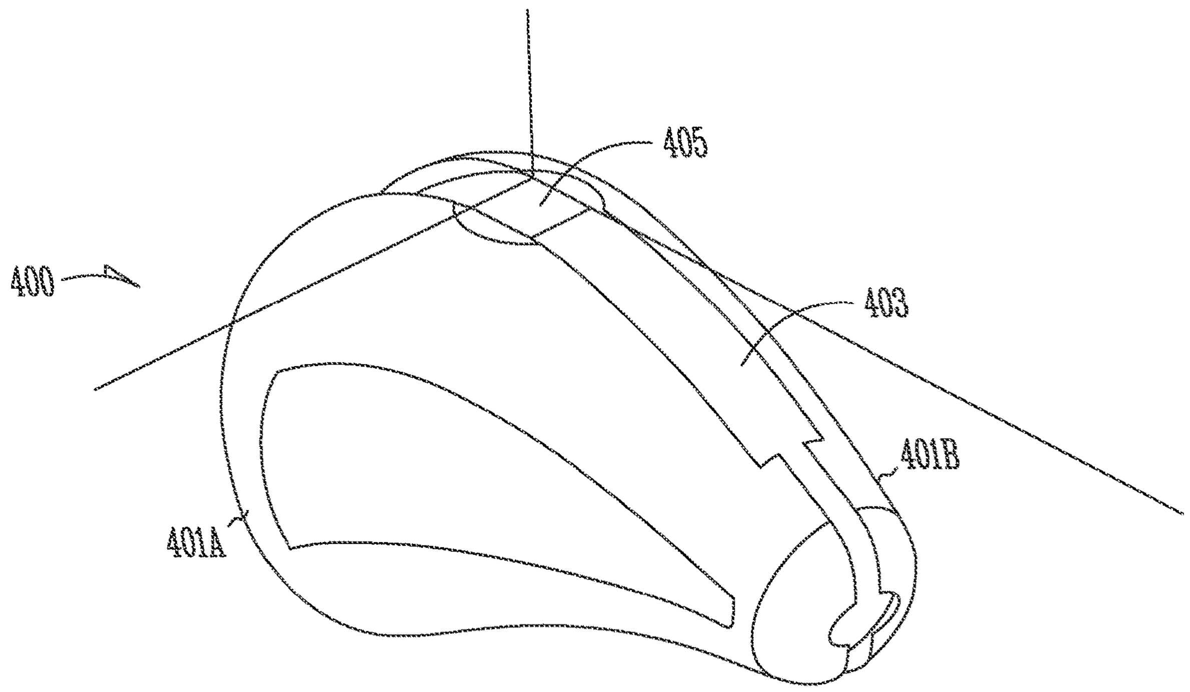
FIG. 4 illustrates a housing for a receiver-in-canal (RIC) type of hearing aid.

FIG. 4 shows an RIC type hearing aid that includes a housing 400 made up of two half-sections 401*a* and 401*b*. As described above, the antenna 190 may be integrated into each of the sections 401*a* and 401*b*, or the sections 401*a* and 401*b* may be made of conductive material so as to constitute a sold bowtie-type antenna with the two sections separated by a dielectric divider 403. Also shown is an antenna feedpoint 405 for connecting to the output of wireless transceiver 180. As shown in the figure, the feedpoint 405 is located approximately in the middle of the top of the hearing aid. Placing the feedpoint more towards the front of the hearing aid may provide better impedance characteristics and result in a wider bandwidth of operation.

Figure 5A:
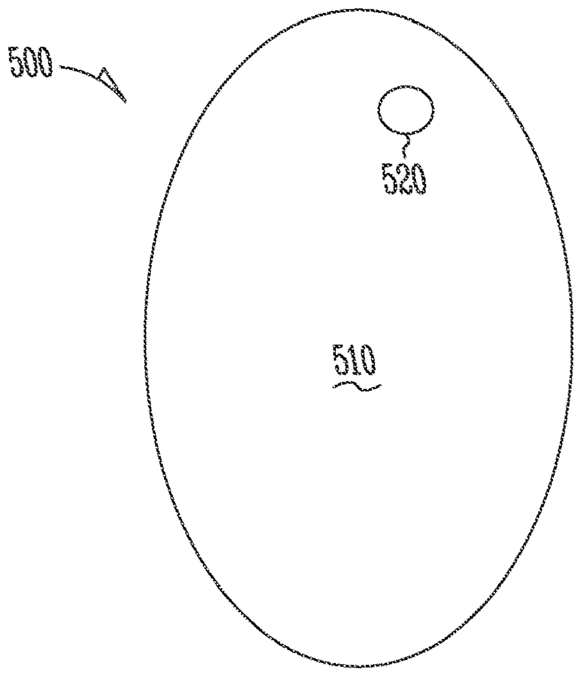
FIGS. 5A and 5B illustrate a housing for an in-the-canal (ITC) type of hearing aid.
Figure 5B:
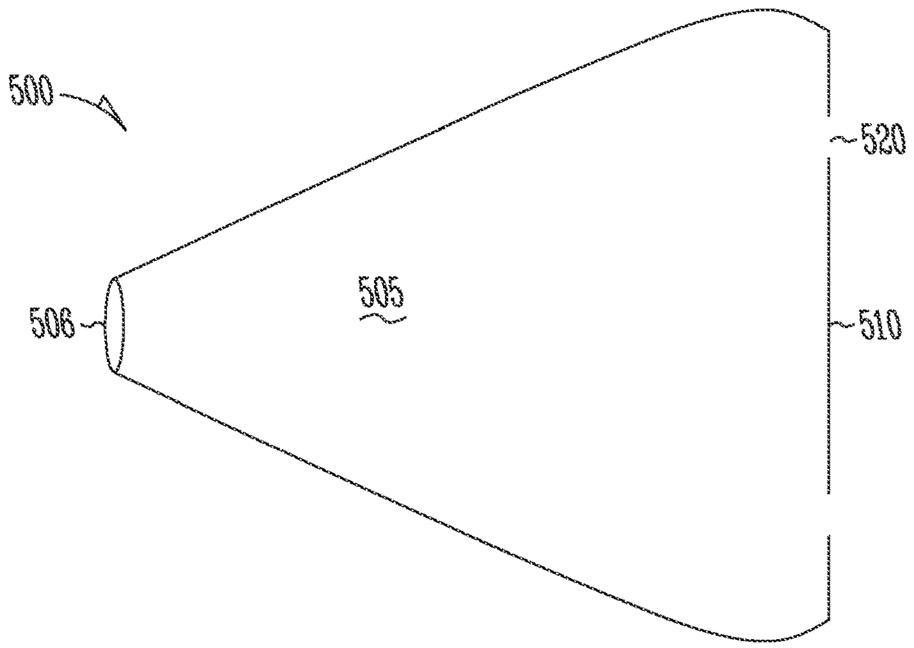

FIGS. 5A and 5B show another embodiment in which the housing of an ITC type of hearing aid is used to form a solid bowtie-type antenna. FIGS. 5A and 5B show a top view and a side view, respectively, of an example housing or enclosure 500 for the hearing aid. The enclosure is made up of an ear mold or shell 505, within which are housed the electronic components described above with reference to FIG. 1, and a faceplate 510. At the end of the ear mold opposite the faceplate is an outlet port 506 for the receiver to convey sound to the wearer's ear. The faceplate includes a sound inlet port 520. In one embodiment, the two sections of solid bowtie type antenna are formed by the shell 505 and faceplate 510.

Figure 6:
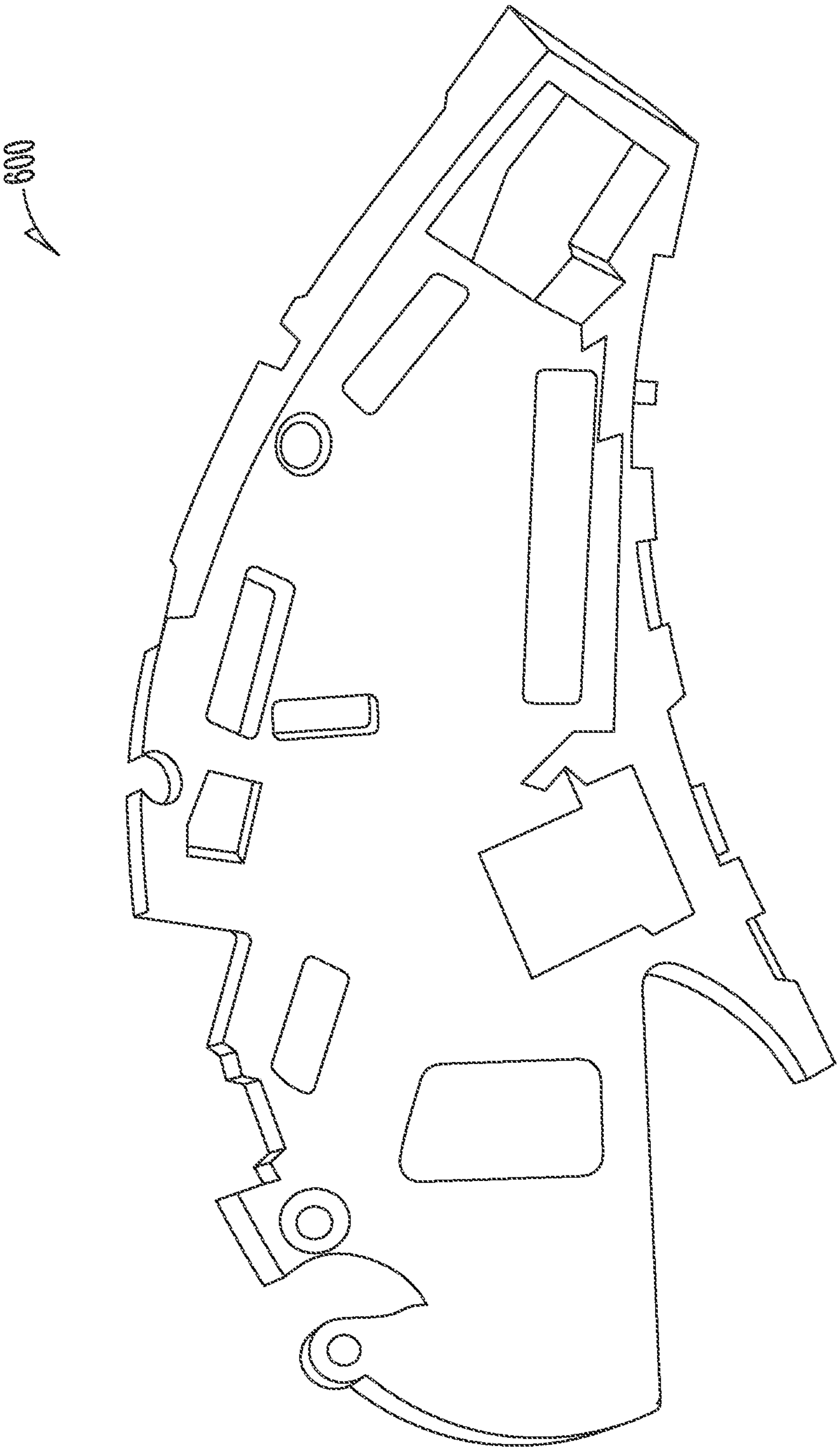
FIG. 6 illustrates an example spine or framework for a hearing aid housing.

FIG. 6 shows an example of a internal framework or spine 600 that is contained within the hearing aid housing and upon which may be mounted the internal components of the hearing aid. The bowtie antenna 190 may be printed or otherwise disposed on the spine 600 in one embodiment.

EXAMPLE EMBODIMENTS

In one embodiment, a hearing aid comprises: a housing, wherein the housing contains components that include a microphone for converting an audio input into an input signal, a digital processing circuitry for processing the input signal, an output state to produce an output signal in a manner that compensates for the patient's hearing deficit, and a wireless transceiver connected to the digital processing circuitry; an antenna having a feedpoint connected to the wireless transceiver; and wherein the antenna is a bowtie-type antenna integrated with the housing and configured to radiate with polarization optimized for ear to ear communications. The bowtie-type antenna may be formed by two half-sections of the housing made of conductive material and separated by a dielectric material or formed by flex circuits disposed on the interior of two half-sections of the housing. The bowtie-type antenna may be printed on the exterior of two half-sections of the housing. The housing may be adapted to be worn behind a user's ear and may contain a speaker for converting the output signal into an audio output so as to constitute a behind-the-ear (BTE) type of hearing aid. The output stage contained within the housing may connected electrically to a speaker for converting the output signal into an audio output, wherein the speaker is adapted to be worn in the auditory canal of user to constitute a receiver-in-canal (RIC) type of hearing aid. The housing may further contains a speaker for converting the output signal into an audio output and is adapted to be worn in the ear of a user, and the housing may comprise a shell adapted to be worn in the ear in which is integrated one-half of the bowtie-type antenna and a faceplate in which is integrated the other half of the bowtie-type antenna. The wireless receiver is designed to operate in the 2.4 GHz or 900 MHz band. The antenna may be a solid bowtie-type antenna or a form bowtie-type antenna. A hearing assistance system may comprise two hearing aids in accordance with any of the embodiments described above.

It is understood that digital hearing aids include a processor. In digital hearing aids with a processor, programmable gains may be employed to adjust the hearing aid output to a wearer's particular hearing impairment. The processor may be a digital signal processor (DSP), microprocessor, microcontroller, other digital logic, or combinations thereof. The processing may be done by a single processor, or may be distributed over different devices. The processing of signals referenced in this application can be performed using the processor or over different devices. Processing may be done in the digital domain, the analog domain, or combinations thereof. Processing may be done using subband processing techniques. Processing may be done using frequency domain or time domain approaches. Some processing may involve both frequency and time domain aspects. For brevity, in some examples drawings may omit certain blocks that perform frequency synthesis, frequency analysis, analog-to-digital conversion, digital-to-analog conversion, amplification, buffering, and certain types of filtering and processing. In various embodiments the processor is adapted to perform instructions stored in one or more memories, which may or may not be explicitly shown. Various types of memory may be used, including volatile and nonvolatile forms of memory. In various embodiments, the processor or other processing devices execute instructions to perform a number of signal processing tasks. Such embodiments may include analog components in communication with the processor to perform signal processing tasks, such as sound reception by a microphone, or playing of sound using a receiver (i.e., in applications where such transducers are used). In various embodiments, different realizations of the block diagrams, circuits, and processes set forth herein can be created by one of skill in the art without departing from the scope of the present subject matter.

It is further understood that different hearing assistance devices may embody the present subject matter without departing from the scope of the present disclosure. The devices depicted in the figures are intended to demonstrate the subject matter, but not necessarily in a limited, exhaustive, or exclusive sense. It is also understood that the present subject matter can be used with a device designed for use in the right ear or the left ear or both ears of the wearer.

The present subject matter is demonstrated for hearing assistance devices, including hearing aids, including but not limited to, behind-the-ear (BTE), in-the-ear (ITE), in-the-canal (ITC), receiver-in-canal (RIC), or completely-in-the-canal (CIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in the ear canal of the user, including but not limited to receiver-in-canal (RIC) or receiver-in-the-ear (RITE) designs.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A hearing aid, comprising:

a shell that contains electronic components of the hearing aid, including a wireless transceiver;

a faceplate coupled to the shell; and a bowtie antenna formed by a first antenna section and a second antenna section, the shell including the first antenna section and the faceplate including the second antenna section.

2. The hearing aid of claim 1, wherein, when the hearing aid is worn by a user in one ear, the bowtie antenna is oriented to radiate with linear polarization such that an electric field is perpendicular to a head of the user.

3. The hearing aid of claim 1, wherein the bowtie antenna is formed by flex circuits disposed on an interior of the shell and an interior of the faceplate.

4. The hearing aid of claim 1, wherein:

the shell includes a conductive material so as to constitute the first antenna section, the faceplate includes the conductive material so as to constitute the second antenna section, and the hearing aid further includes a dielectric material that separates the first antenna section and the second antenna section.

5. The hearing aid of claim 1, wherein:

the first antenna section is printed on an exterior or an interior of the shell, and the second antenna section is printed on an exterior or an interior of the faceplate.

6. The hearing aid of claim 1, wherein the shell further contains:

a microphone for converting an audio input into an input signal;

digital processing circuitry for processing the input signal to produce an output signal in a manner that compensates for a hearing deficit of a user of the hearing aid; and a speaker for converting the output signal into an audio output.

7. The hearing aid of claim 1, wherein the hearing aid is an in-the-canal hearing aid or a completely-in-the-canal hearing aid.

8. A method for constructing a hearing aid, comprising:

forming a first antenna section of a bowtie antenna in a shell of the hearing aid;

forming a second antenna section of the bowtie antenna in a faceplate of the hearing aid; and coupling the faceplate to the shell, wherein when the faceplate is coupled to the shell, the shell contains electronic components of the hearing aid including a wireless transceiver.

9. The method of claim 8, wherein, when the hearing aid is worn by a user in one ear, the bowtie antenna is oriented to radiate with linear polarization such that an electric field perpendicular is to a head of the user.

10. The method of claim 8, wherein:

forming the first antenna section comprises disposing a first flex circuit on an interior of the shell, and forming the second antenna section comprises disposing a second flex circuit on an interior of the faceplate.

11. The method of claim 8, wherein:

forming the first antenna section comprises forming the shell of a conductive material, forming the second antenna section comprises forming the faceplate of the conductive material, and disposing a dielectric material in the hearing aid that separates the first antenna section and the second antenna section.

12. The method of claim 8, wherein:

forming the first antenna section comprises printing the first antenna section on an exterior or an interior of the shell, and forming the second antenna section comprises printing the second antenna section on an exterior or an interior of the faceplate.

13. The method of claim 8, wherein the shell further contains:

a microphone configured to convert an audio input into an input signal;

digital processing circuitry configured to process the input signal to produce an output signal in a manner that compensates for a hearing deficit of a user; and a speaker configured to convert the output signal into an audio output.

14. The method of claim 8, wherein the hearing aid is an in-the-canal hearing aid or a completely-in-the-canal hearing aid.

* * * * *